US012793008B2

(12) United States Patent
McColeman et al.

(10) Patent No.: US 12,793,008 B2
(45) Date of Patent: Nov. 10, 2026

(54) EARLY INTERCEPTION AND CORRECTION IN ONLINE CONVERSATIONS USING LARGE LANGUAGE MACHINE-LEARNED MODELS

(71) Applicant: Maplebear Inc., San Francisco, CA (US)

(72) Inventors: Ryan McColeman, Toronto (CA); Ryan Martin, Toronto (CA); Brent Scheibelhut, Toronto (CA); Shaun Navin Maharaj, Vaughan (CA); Mark Oberemk, Toronto (CA)

(73) Assignee: Maplebear Inc., San Francisco, CA (US)

( * ) Notice: Subject to any disclaimer, the term of this patent is extended or adjusted under 35 U.S.C. 154(b) by 218 days.

(21) Appl. No.: 18/632,540

(22) Filed: Apr. 11, 2024

(65) Prior Publication Data

US 2024/0346441 A1 Oct. 17, 2024

Related U.S. Application Data

(60) Provisional application No. 63/458,942, filed on Apr. 13, 2023.

(51) Int. Cl.
*G06Q 10/087* (2023.01)
*G06N 5/04* (2023.01)

(52) U.S. Cl.
CPC ............. *G06Q 10/087* (2013.01); *G06N 5/04* (2013.01)

(58) Field of Classification Search
CPC ............. G06Q 10/087; G06Q 10/0872; G06Q 10/08724; G06N 5/04
See application file for complete search history.

(56) References Cited

U.S. PATENT DOCUMENTS

| | | | | |
|---|---|---|---|---|
| 2019/0130904 | A1* | 5/2019 | Homma | G06N 3/088 |
| 2021/0287171 | A1* | 9/2021 | Kim | G06K 7/1413 |
| 2023/0018620 | A1* | 1/2023 | Thomas | G06F 3/0346 |

OTHER PUBLICATIONS

PCT International Search Report and Written Opinion, PCT Application No. PCT/US 24/23996, Jul. 12, 2024, 17 pages.

* cited by examiner

*Primary Examiner* — Ariel J Yu
*Assistant Examiner* — Denisse Y Ortiz Roman
(74) *Attorney, Agent, or Firm* — Fenwick & West LLP

(57) ABSTRACT

An online system performs an inference task in conjunction with the model serving system or the interface system to continuously monitor conversations between users and shoppers to determine whether a message sent by a sending party can be automatically responded to rather than prompting the receiving party for a manual response. The online system automatically provides a response to the message without the receiving party's manual involvement. In one or more embodiments, the online system can infer whether a question can be intercepted and/or suggests one or more available answers the sender can consider as feedback without a manual response from the receiver.

18 Claims, 6 Drawing Sheets

EARLY INTERCEPTION AND CORRECTION IN ONLINE CONVERSATIONS USING LARGE LANGUAGE MACHINE-LEARNED MODELS

CROSS REFERENCE TO RELATED APPLICATIONS

This application claims the benefit of U.S. Provisional Application No. 63/458,942, filed on Apr. 13, 2023, which is incorporated by reference in its entirety.

BACKGROUND

An online system is an online platform that connects users and retailers. For example, a user can place an order for purchasing items, such as groceries, from participating retailers via the online system, with the shopping being done by a personal shopper. In some instances, the online system generates a communication interface that allows a user to communicate with a picker that is servicing the user's order. Oftentimes, the user or the picker may make an inquiry or request about the order to the other party that the other party may have to manually respond to in order for the order to be fulfilled or may not know the response to as the other party does not have access to the appropriate information for answering the questions. This may create undesired delays in fulfilling the user's order.

SUMMARY

In accordance with one or more aspects of the disclosure, an online system performs an inference task in conjunction with the model serving system or the interface system to continuously monitor conversations between users and shoppers to determine whether a message sent by a sending party can be responded to rather than, for example, prompting the receiving party for a manual response. The online system automatically provides a response to the message without the receiving party's involvement. In one or more embodiments, the online system can infer whether a question can be intercepted and/or suggests one or more available answers the sender can consider as feedback without a manual response from the receiver. The online system continuously provides one or more messages from a conversation to the model serving system or the interface system and receives a response for each question that indicates whether the question can be intercepted, and a response can be automatically generated. If the message can be intercepted, the online system may also suggest one or more answers to the question that are certain actions or suggestions the sender of the message can consider as feedback.

DETAILED DESCRIPTION

Figure 1A:
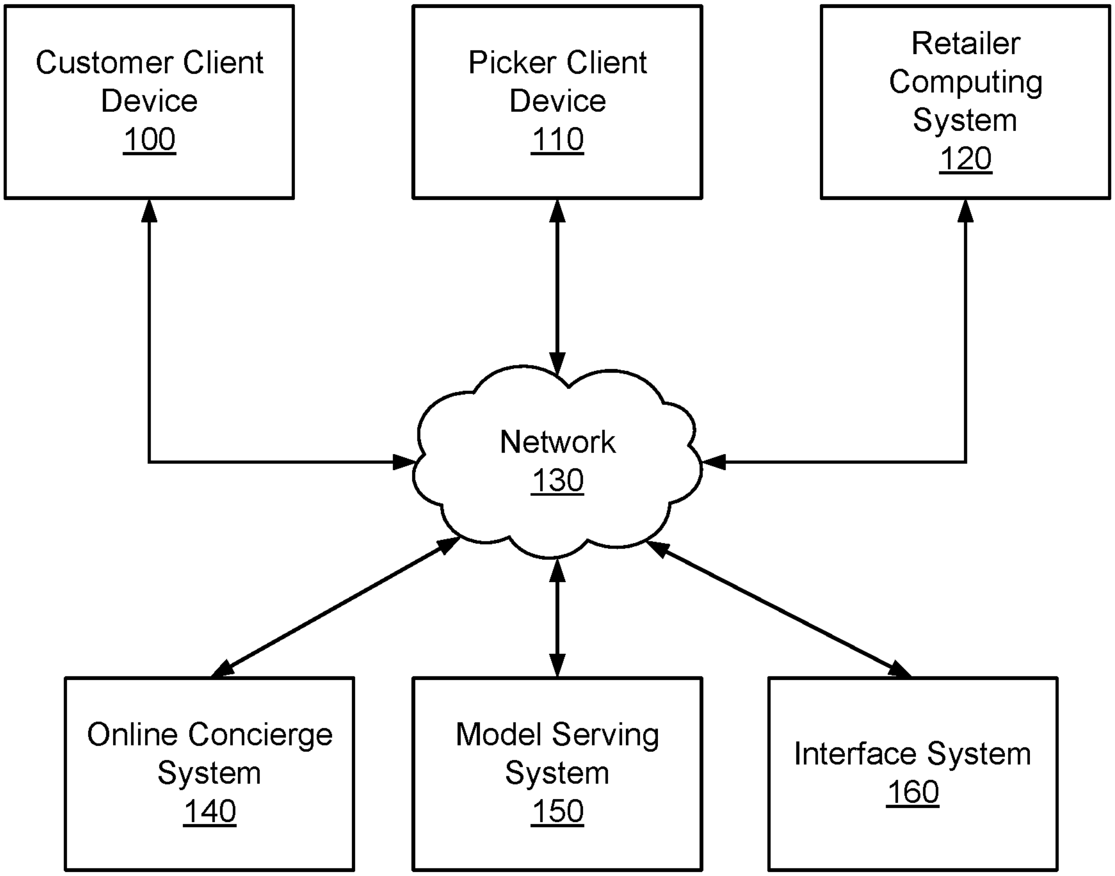
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. In addition, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system

140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate through wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customer users can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provides portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker user has collected the groceries ordered by the customer user, the picker delivers the groceries to a location transmitted to the picker client device 110 by the online system 140. The online system 140 is described in further detail below with regards to FIG. 2.

The model serving system 150 receives requests from the online system 140 to perform one or more inference tasks using machine-learned models. The inference tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbot applications, and the like. In one or more embodiments, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, or video data) and encodes the input data into a set of input tokens. In one or more embodiments, the machine-learned model is a generative multi-modal transformer architecture coupled to receive various data modalities (e.g., image, text, video) and generate tokens that correspond to various data modalities (e.g., image, text, video). The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one or more embodiments, the inference task for the model serving system 150 can primarily be based on reasoning and summarization of knowledge specific to the online system 140, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

Thus, in one or more embodiments, the online system 140 is connected to an interface system 160. The interface system 160 receives an external corpus of data from the online system 140 and builds a structured index over the data using another machine-learned language model or heuristics. The interface system 160 receives one or more task requests from the online system 140 based on the external data. The interface system 160 constructs one or more prompts for input to the model serving system 150. A prompt may include the task request of the user and context obtained from the structured index of the external data. In one instance, the context in the prompt includes portions of the structured indices as contextual information for the query. The interface system 160 obtains one or more responses to the query from the model serving system 150 and synthesizes a response. While the online system 140 can generate a prompt using external data as context, oftentimes, the amount of information in the external data exceeds prompt size limitations configured by the machine-learned language model. The interface system 160 can resolve prompt size limitations by generating a structured index of the data and offers data connectors to external data and provides a flexible connector to the external corpus.

In one or more embodiments, the online system 140 performs one or more inference tasks in conjunction with the model serving system 150 and/or the interface system 160 to continuously monitor conversations between users and shoppers to determine whether a message sent by a sending party can be responded to rather than prompting the receiving party for a manual response. In a primary example referred to throughout the specification, the sending party may be the shopper fulfilling an order, and the shopper may send a message that includes a question to the user of the online system 140 who placed the order where the question solicits user feedback.

Figure 3:
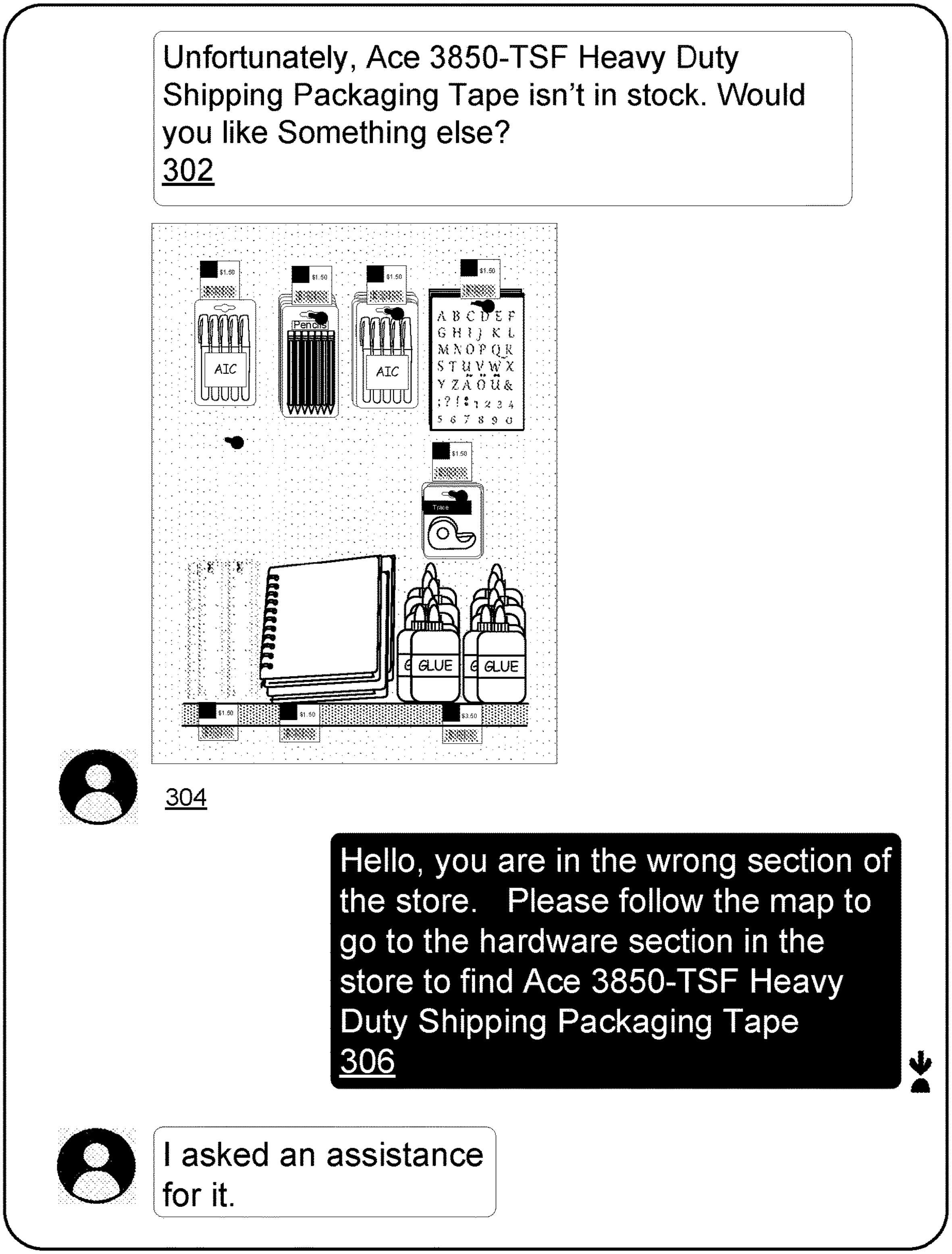
FIG. 3 illustrates an example conversation between a shopper and a user, in accordance with one or more embodiments.

For example, an example message from a shopper may be "Unfortunately, [particular item] of your order is not available in this store. Would you like something else?" with an image taken by the shopper at the store where the shopper was looking for the required item. The online system 140 constructs a prompt including the message, a task request to the LLM on whether an automated response can be generated for the message, and other input information including the current chat history, attached imagery, geolocation data, previous conversational data between shoppers and users, and the like. For example, the online system 140 receives a response from the LLM: "You are in the wrong section of the store." FIG. 3 illustrates an example of the communication interface, which will be described in more detail below.

Based on the output from the LLM, the online system 140 identifies answers including, for example, actions that the shopper can take or suggested alternative options to the user based on previous order data. In one or more embodiments, the online system 140 automatically provides a response to the message without the receiving party's manual involvement (e.g., without requiring the user who placed the order via the online system 140 to review and/or respond to the message). The online system 140 continuously provides one or more messages from a conversation to the model serving system 150 and/or the interface system 160 and receives a response for each message that indicates whether the message can be intercepted, and automatically responds with an answer if possible.

In one or more embodiments, given a conversation between a shopper and a user, the online system 140 monitors the messages exchanged during the conversation. For a message, the online system 140 parses the message and provides one or more inputs to the model serving system 150 and/or the interface system 160. The online system 140 in conjunction with the model serving system 150 or the interface system 160 identifies portions of the message that is a question being asked in the message and portions of the message that pertain to the question (e.g., chat messages, attached imagery, and shopper's current geographic location in a store). The online system 140 obtains a response that indicates whether the question can be automatically intercepted. As an example, the online system 140 may infer that the question by a shopper is a mistake (e.g., shopper is in the wrong part of the store) that the online system 140 can automatically correct and intercept with an answer including an appropriate correction.

Based on the determination, the online system 140 identifies whether the message is one that the online system 140 can answer automatically with one or more suggestions or corrections. Specifically, if the online system 140 has a high degree of confidence that the question can be automatically answered, the online system 140 may prevent the message of the sender from being sent to the end user, and instead reply on their behalf with an answer. Returning to the example above, the online system 140 may identify that the question can be answered with a correct location of the requested item and may reply to the shopper with an instruction to go to a particular section using the map of the store.

In this manner, the online system 140 identifies messages for which automated responses can be formulated as automated feedback to the messages, and automatically intercepts conversations on behalf of the receiving party. This allows the online system 140 to eliminate human interaction for messages that require user feedback, allowing for automated and efficient processing of customer orders. Moreover, in many instances, a receiving party (e.g., a user of an order) may not know the response to an inquiry received through the communication interface, even though with the appropriate information, the inquiry is an easy one to answer. By using the method described herein, the online system 140 can use an LLM to extract relevant information for responding to inquiries received through the communication interface, such that responses can be formulated real-time.

Moreover, as the context is within an online computing system, conversations occurring between users (e.g., picker and customer users) typically cannot be monitored by a human auditor due to, for example, privacy concerns, and even if so, the auditor may not be capable of extracting information from large external databases (e.g., item catalog, retailer store map) when the conversation is occurring real-time between users to fulfill an order. Thus, by configuring a computing system (e.g., machine, server) to identify opportunities to generate intercepted responses in a conversation and generating these responses in conjunction with a LLM, the online system 140 can quickly correct information, make suggestions to users or take appropriate actions to improve operations and enhance the satisfaction of the user.

Figure 1B:
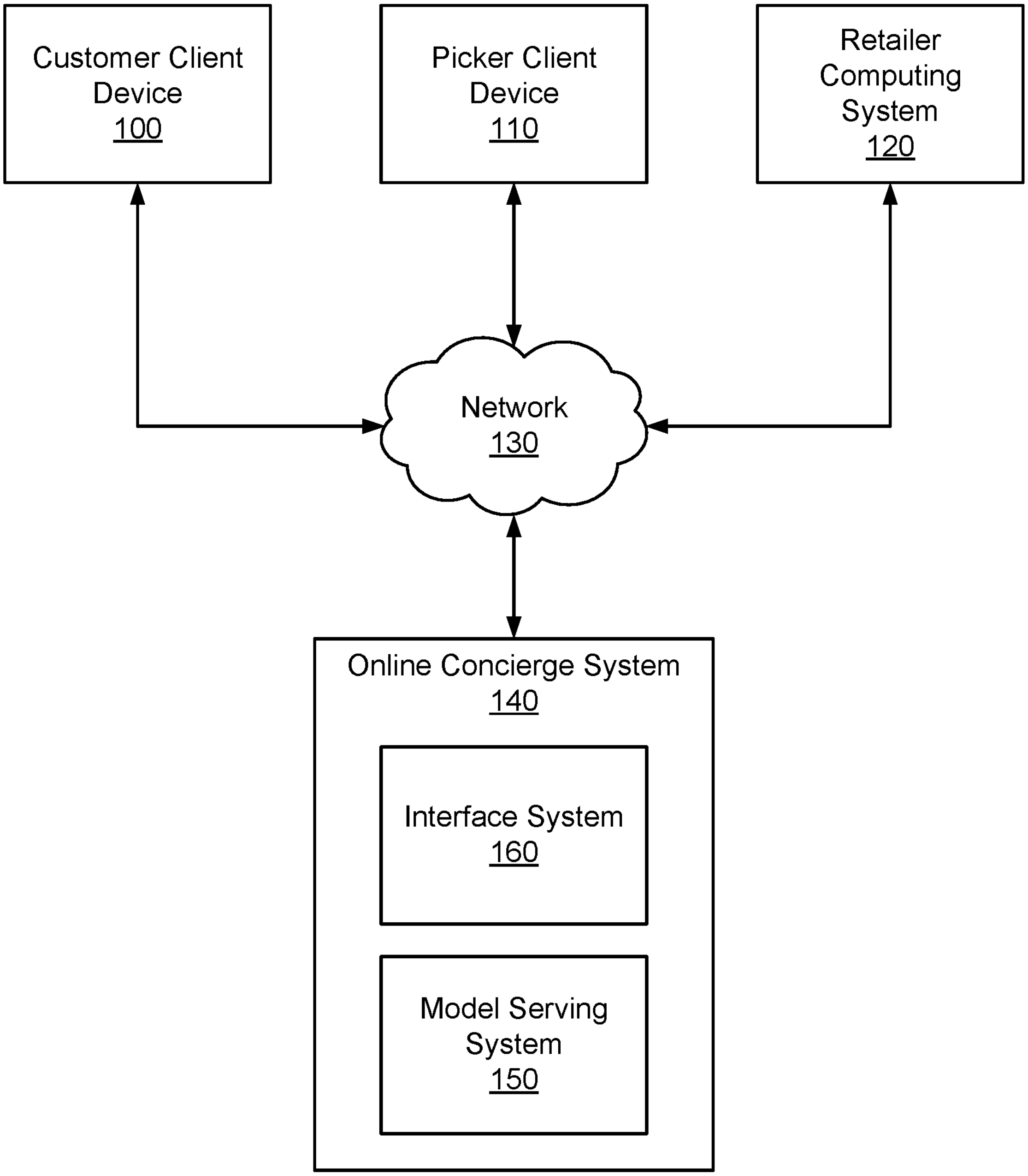
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 are each managed by an entity separate from the entity managing the online system 140. In one or more embodiments, as illustrated in the example system environment in FIG. 1B, the model serving system 150 or the interface system 160 is managed and deployed by the entity managing the online system 140.

Figure 2:
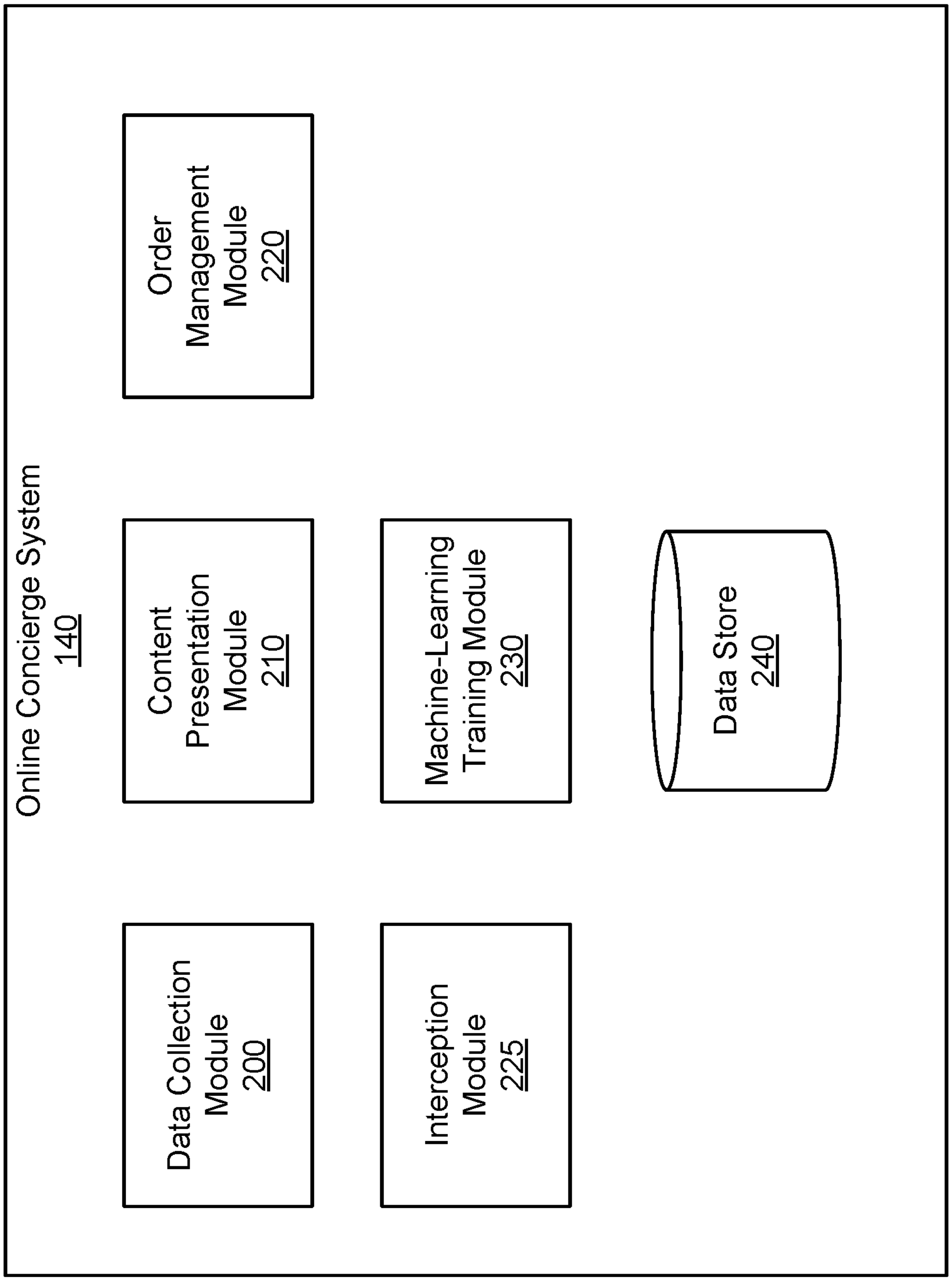
FIG. 2 illustrates an example system architecture for an online system, in accordance with one or more embodiments.

FIG. 2 illustrates an example system architecture for an online system 140, in accordance with one or more embodiments. The system architecture illustrated in FIG. 2 includes a data collection module 200, a content presentation module 210, an order management module 220, a question parsing module 225, a predictive answering module 227, a machine learning training module 230, and a data store 240. Alternative embodiments may include more, fewer, or different components from those illustrated in FIG. 2, and the functionality of each component may be divided between the components differently from the description below. In addition, each component may perform their respective functionalities in response to a request from a human, or automatically without human intervention.

The data collection module 200 collects data used by the online system 140 and stores the data in the data store 240. The data collection module 200 may collect data describing a user if the user has previously explicitly consented to the online system 140 collecting data describing the user. In addition, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

In one or more embodiments, the data collection module 200 also collects communication data, which is different types of communication between shoppers and users of the online system 140. For example, the data collection module 200 may obtain text-based, audio-call, video-call based communications between different shoppers and users of the online system 140 as orders are submitted and fulfilled. The data collection module 200 may store the communication information by individual user, individual shopper, per geographical region, per subset of users having similar attributes, and the like.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more recommendations for presentation to the customer while the customer is engaged with the ordering interface. The list of ordered items of a customer may be referred to as a basket. As described in conjunction with FIGS. 1A and 1B, the recommendations are generated based on the inferred purpose of the basket of the customer and include one or more suggestions to the customer to better fulfill the purpose of the basket.

In one instance, the recommendations are in the form of one or more equivalent baskets that are modifications to an existing basket that serve the same or similar purpose as the original basket. The equivalent basket is adjusted with respect to metrics such as cost, healthiness, whether the basket is sponsored, and the like. For example, an equivalent basket may be a healthier option compared to the existing basket, a less expensive option compared to the existing basket, and the like. The content presentation module 210 may present the equivalent basket to the customer via the ordering interface with an indicator that states how an equivalent basket improves or is different from the existing basket (e.g., more cost-effective, healthier, sponsored by a certain organization). The content presentation module 210 may allow the customer to swap the existing basket with an equivalent basket.

In one instance, when the basket includes a list of edible ingredients, the recommendations are in the form of a list of potential recipes the ingredients can fulfill, and a list of additional ingredients to fulfill each recipe. The content presentation module 210 may present each suggested recipe and the list of additional ingredients for fulfilling the recipe to the customer. The content presentation module 210 may allow the customer to automatically place one or more additional ingredients in the basket of the customer.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The interception module 225 retrieves messages occurring between a customer client device 100 and a picker client device 110 and determines whether a message sent by a sending party can be automatically processed rather than prompting the receiving party for a manual response. Specifically, the interception module 225 continuously monitors and retrieves messages between a user and a shopper from the order management module 220. In one or more embodiments, the interception module 225 determines whether a message sent by a sending party can be automatically responded to rather than prompting the receiving party for a manual response. Specifically, the interception module 225 determines whether the message including the question and other contextual information on the question is similar to previous instances of messages where the online system 140 has responded to before and is able to suggest one or more answers (e.g., corrections, suggested actions) in response to the message.

FIG. 3 is an example conversation between a shopper and a user on a communication interface generated on a client device 110 of the user, in accordance with an embodiment. As illustrated in FIG. 3, at one point in the conversation, the picker submits a message 302 to the user that an ordered item "Ace 3850-TSF Heavy Duty Shipping Packaging Tape" is not in stock and whether the user would like a replacement item. An intercepted response "Hello, you are in the wrong section of the store. Please follow the map to go to the hardware section in the store to find Ace 3850-TSF Heavy Duty Shipping Packaging Tape" 306 instructs the shopper to correct the location of the shopper based on the intercepted message 302.

In one or more embodiments, the interception module 225 constructs a prompt and a task request to the LLM on whether the message can be intercepted for a response instead of manually waiting for a response from the user. The prompt may include one or more inputs pertaining to the message. An example prompt to the LLM of the model serving system 150 may be:

"Given message of [message content], [other inputs pertaining to message] can the message be answered to provide feedback?"

The online system 140 may receive a response from the LLM that may be:

"Based on the information you gave, the sender of the message is at the wrong section of the store."

In such an example, it may be inferred from the parsed message of the shopper and other inputs to the online system 140 the shopper's location within the store and then determined that the shopper is not in the near vicinity of the requested item. It may also be inferred that the location of the requested item would be provided via a database of the online system 140 that has items described in a product catalog and precise data representation of the location at which the requested item can be found.

In one or more embodiments, the interception module 225 includes a question parsing component and a predictive answering component. The question parsing component parses out the core question being asked and the context for the question in conjunction with, for example, a multi-modal LLM. The predictive answering components identify whether the messages or requests are ones that the system can answer automatically. If the predictive answering component has a high degree of confidence, the component will prevent the receiving party's response from being sent to the sending party and instead reply on behalf of the receiving party with a clarifying answer.

In one or more embodiments, the interception module 225 provides a number of inputs, such as the chat messages parsed via the LLM, attached imagery parsed via algorithmic image analysis and subject identification, shopper application location data to identify approximate position of the shopper in the store, storage catalog and inventory data to obtain expected geographic positioning of products within the store, past order data within that location of the store, past item location information within that location, past conversational data between shoppers and customers, and past conversations specifically for the store (e.g., since some stores have merchandised products in different locations, and oftentimes in multiple places in the store).

In one or more embodiments, the interception module 225 may also receive images and other sensor data at a time stamp from a smart shopping cart. A smart shopping cart includes multiple load sensors and cameras that capture images and sensor data of the environment surrounding the shopping cart. The question parsing module 225 may receive images and sensor data to determine item availability of an item. The interception module 225 receives images of a surrounding aisle which can provide greater context to the LLM regarding the expected geographic position of products within the store, item availability, and the approximate location of the shopper in the store. The timestamp of the image and sensor data received from the smart shopping cart may also provide the interception module 225 with greater certainty regarding the item's availability, the expected geographic position of the item within the store, and the approximate location of the shopper within the store.

Based on extracted core questions, the interception module 225 determines one or more answer options that the interception module 225 can provide as answers to the question. The interception module 225 also determines for each option a degree of confidence that the question is answerable. If there is a high degree of confidence, the interception module 225 may formulate a response to the message and output the message to the user.

In the example shown in FIG. 3, the interception module 225 determines with high confidence that the question is a mistake by the shopper and can be corrected by, for example, pointing to the correct location of the requested item obtained by looking up the item and the location for that item in the retailer store in a database. The interception module 225 outputs an answer to the shopper that the shopper is at the wrong location of the store and formulates a textual response to the inquiry informing the shopper with a suggestion to follow the map of the store to go to the hardware section to find the requested item. The user need not reply in the communication interface, but in the meantime may see the chain of communication between the picker's original message and the automated messages generated using the LLM.

While FIG. 3 illustrates one example of how the online system 140 can automatically respond to messages, another example is when a user as the sending party inquires the shopper via a message to look for an item which is not on the user's order. The interception module 225 in conjunction with the model serving system 150 or the interface system 160 parses the message from the user, infers the user's inquiry, and cross-examines the requested item mentioned by the user with items within the catalog of the online system 140. The interception module 225 determines that a prompt can be automatically made to the user to either choose the item of "best-fit" or automatically adds the item to the order. The interception module 225 may output a textual answer that the requested item was automatically added to the order and may make an API call to an appropriate API to add the requested item to the user's order.

As another example, when a user as a sending party inquires that a certain item in the order is foundational or key to the order. The interception module 225 may suggest to the user whether the user would like to cancel the order if the key items cannot be found. The picker when fulfilling the order notifies the application of the online system 140 that the item cannot be found. The interception module 225 automatically notifies the picker and the user that the order will be canceled, and generates an API call to cancel the order.

As yet another example, when the shopper as a sending party sends a message indicating the shopper cannot find a particular item, and takes an image of the shelving area as proof, and messages the user to indicate that the particular item is not available. The interception module 225 in conjunction with the model serving system 150 or the interface system 160 may infer that the ordered item is actually visible in the image, and may determine that an automatic response to the shopper can be made to notify the shopper that the requested item is in the shelving area but with a new packaging label. The interception module 225 may output the message to the shopper indicating that the requested item is in the shelving area and to look closer in detail for the requested item.

Alternatively, if the requested item was not in the image, the interception module 225 may determine that another item is present in the image, which is a good replacement for the requested item, and an automatic response can be made to the shopper noting this fact. The interception module 225 may output an automatic response to the message to the shopper that the replacement item in the image is a good replacement for the original item and the shopper can consider picking up the replacement item instead.

Figure 4:
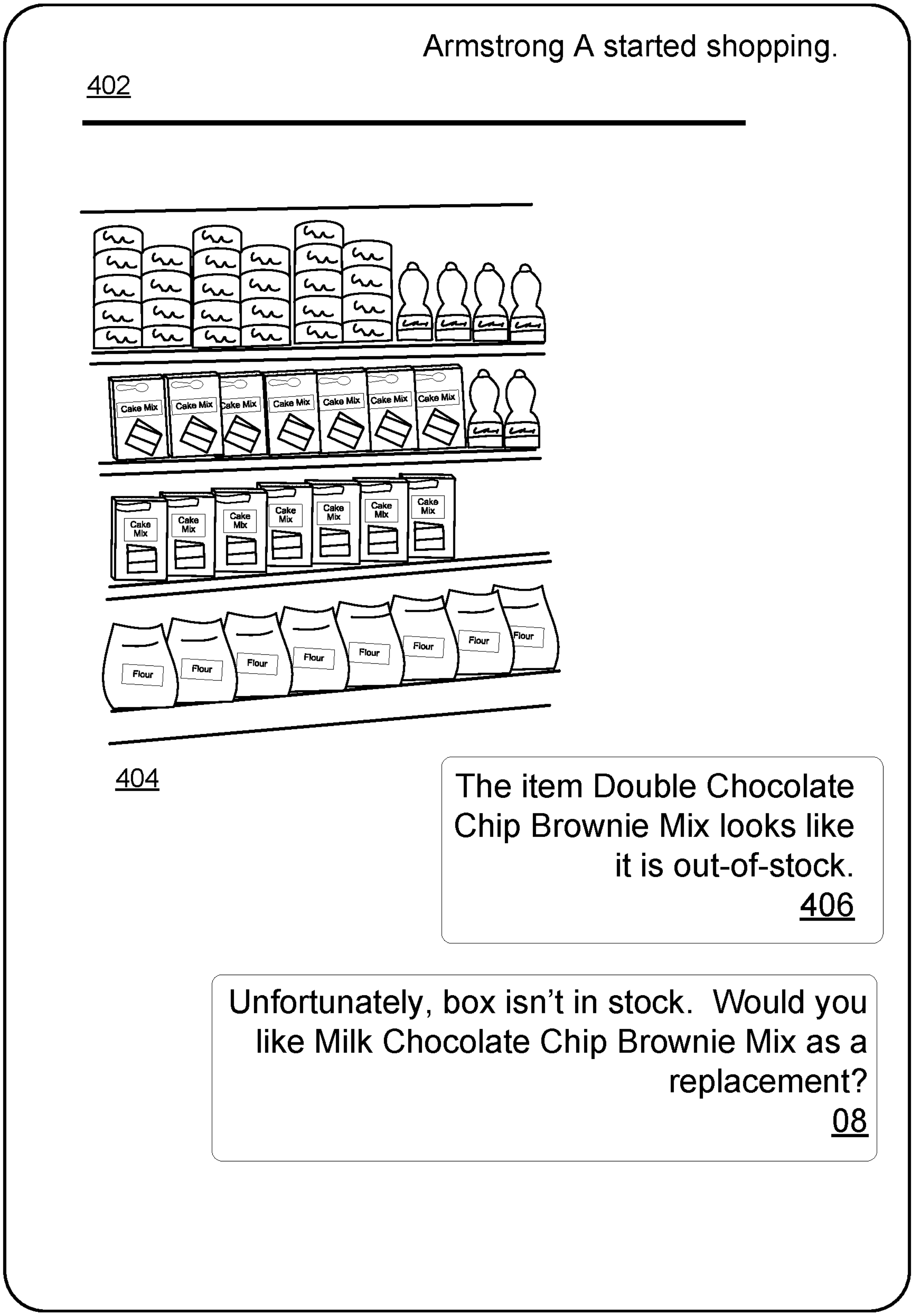
FIG. 4 illustrates an example conversation between a shopper and a user, in accordance with one or more embodiments.

In the example shown in FIG. 4, the interception module 225 determines with high confidence that a requested item is not present in the image and automatically responds with a replacement for the requested item. In the example chat log 402 between shopper Armstrong A and a user, the shopper submits a photo of a shelf 404 where the requested item of a Double Chocolate Chip Brownie Mix should be. The interception module 225, in accordance with one or more embodiments, parses the received image and determines that the shopper is in the correct location and that indeed the item is missing. The interception module 225 notifies the user that "This item of the Double Chocolate Chip Brownie Mix looks like it is out-of-stock" 406. The interception module 225, in accordance with one or more embodiments, responsive to detecting that the requested Double Chocolate Chip Brownie Mix is not in stock, determines a corresponding replacement of Milk Chocolate Chip Brownie Mix 408 to automatically present to the user. The interception module 225 automatically presents a message to the user "Unfortunately, box isn't in stock. Would you like Milk Chocolate Chip Brownie Mix as a replacement?" 408.

Fine-Tuning LLM With Intercepted Responses

In one or more embodiments, the interception module 225 in conjunction with the machine learning training module 230 may perform fine-tuning of the LLM. To perform fine-tuning, the interception module 225 obtains training data from previous instances of conversations between a sending party and a receiving party on a communication interface (e.g., messaging interface) in which one or more intercepted responses were generated in conjunction with an LLM.

In one or more embodiments, the interception module 225 identifies positive instances of feedback in which positive feedback was received for an intercepted response generated based on the LLM. In other embodiments, the interception module 225 may identify negative instances of feedback where users provided negative feedback on the intercepted responses. The interception module 225 may continue to monitor a conversation after one or more intercepted responses were generated and classify the responses as receiving positive feedback if a human-in-the-loop (e.g., receiving party) confirmed (e.g., upvoted) the content of the intercepted response, or classify the responses as receiving negative feedback if the human-in-the-loop (e.g., receiving party) confirmed (e.g., downvoted) that the content of the intercepted response was incorrect.

As an example, returning to the example conversation in FIG. 3, after the intercepted response 306 is displayed on the communication interface, the picker may respond with "No, I think I am in the right section of the store." After, the user as the receiving party may respond with "Yes, you are at the right section of the store—I've been to this store before." confirming the content of the intercepted response 306 is incorrect. Therefore, this conversation instance may be classified as negative feedback. In contrast, the user as the receiving party may alternatively respond with "No, it seems from the photo that you are at the wrong section of the store." confirming the content of the intercepted response 306 is correct. Therefore, this conversation instance may be classified as positive feedback.

In one or more embodiments, a training data instance may include a prompt and positive outputs obtained from previous conversations that received positive feedback. For example, a prompt may include a picker message that states an item (e.g., green grapes) in the user's order is out-of-stock, an image of the retailer shelf showing the item unavailable, and other types of contextual information such as the map of the retailer store. The positive output is a textual response that confirms the item is out-of-stock and a suggestion to replace the item with another item (e.g., red grapes) that was presented in the image and that received positive feedback from the user.

The interception module 225 obtains such pairs of prompts and positive outputs for the training dataset. The interception module 225 encodes the data into a set of input tokens, in which a token is a numerical vector representing a word, sub-word, phrase, pixels, latent pixels, in a latent space. When the transformer architecture of the machine-learned model (e.g., LLM) is of an autoregressive architecture, the LLM may be applied to generate one or more output tokens that correspond to the positive outputs. An output token is decoded to determine a probability that the decoded token corresponds to a corresponding token in the positive output.

The interception module 225 determines a loss function across the one or more output tokens that indicates a difference (e.g., logit difference) between the tokens in the positive outputs and the output tokens generated by the forward pass of the transformer model. As an example, the loss function may be an NLP loss for each token combined across one or more output tokens generated for the positive text. The interception module 225 obtains one or more terms from the loss function and performs backpropagation to update parameters of the transformer architecture.

Method of Generating Intercepted Responses to Messages

Figure 5:
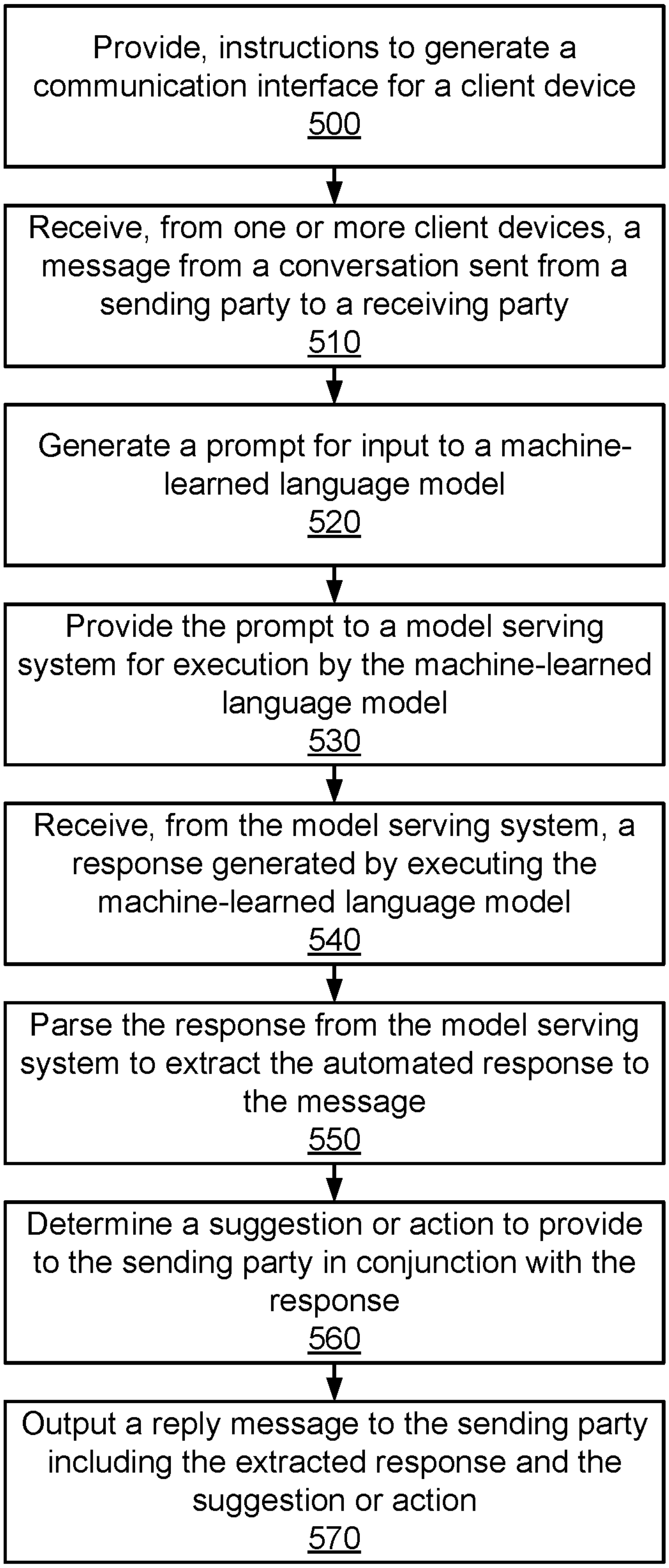
FIG. 5 is a flowchart for a method of inferring whether an automated response can be generated for a message, in accordance with one or more embodiments.

FIG. 5 is a flowchart for a method of the interception module 225, in accordance with one or more embodiments. The interception module 225 provides 500 instructions to generate a communication interface for at least a client device. The interception module receives 510, from one or more client devices, a message from a conversation sent from a sending party to a receiving party. The module generates 520 a prompt for input to a machine-learned language model and provides 530 the prompt to a model serving system for execution by the machine-learned language model. The module receives 540 a response from the machine-learned language model and parses 550 the response from the model serving system to extract an automated response to the message. The module determines 560 a suggestion or action to provide to the sending party in conjunction with the received response and outputs 570 a reply message to the sending party including the extracted response and the suggestion or action.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve Bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

FIG. 3 is a flowchart for a method of inferring whether an automated response can be generated for a message, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system 140 receives 300, from one or more client devices, a message from a conversation sent from a sending party to a receiving party. The online system 140 generates 310 a prompt for input to a machine-learned language model. In one or more embodiments, the prompt specifies at least the message and a request to infer whether an automated response can be generated for the message that provides feedback on the message. The online system 140 provides 320 the prompt to a model serving system for execution by the machine-learned language model for execution. The online system 140 receives 330, from the model serving system, a response generated by executing the machine-learned language model on the prompt. The online system 140 parses 340 the response from the model serving system to extract the automated response to the message. Responsive to the automated response, the online system 140 determines 350 a suggestion or action to provide to the sending party in conjunction with the response. The online system 140 outputs 360 a reply message to the sending party including the extracted response and the suggestion or action.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

providing instructions to generate a communication interface on one or more client devices;

receiving, from the one or more client devices, a message including natural-language text from a conversation sent from a sending party to a receiving party in a chat interface, wherein the receiving party is a user of an order fulfilment system, wherein the sending party is a picker fulfilling an order of the user, and wherein the message is from a picker indicating an item in an order of a user is not available at a retailer store;

providing a database that stores a map of the retailer store;

generating a prompt for input to a machine-learned language model, the prompt specifying at least the message including natural-language text from the chat interface and one or more inputs, and a request to infer whether a response can be generated for the message, and wherein the one or more inputs includes the message, an image of a portion of a retailer store, and the map of the retailer store;

providing the prompt to a model serving system for execution by the machine-learned model for execution;

receiving, from the model serving system, a response generated by executing the machine-learned model on the prompt;

parsing the response from the model serving system to extract the response to the message;

automatically intercepting the conversation in the chat interface by generating an intercepted response to the message based on the parsed response, wherein the intercepted response indicates that an error has been made while fulfilling an order of the receiving party, and includes a suggestion or action to provide to the sending party in conjunction with the response, wherein the suggestion or action to correct the error is generated based on at least the map of the retailer store; and outputting an intercepted response to the sending party including the extracted response or a description of the suggestion or action.

2. The method of claim 1, wherein the message is from a picker indicating an item in an order of a user is not available at a retailer store, wherein the prompt includes the message, an image of a portion of a retailer store, a map of the retailer store, and picker location data identifying a location of the picker in the retailer store, and wherein the intercepted response includes a message that the picker is in a wrong part of the retailer store.

3. The method of claim 2, wherein determining the suggestion or action comprises:

retrieving a location of the item at the retailer store, and wherein the intercepted response includes the suggestion to navigate to the location of the retailer store to find the item.

4. The method of claim 1, wherein the message is from a user requesting a picker to identify an item that is not in an order of the user, wherein identifying the suggestion or action further comprises invoking an application programming interface (API) call to add the item to the order of the user, and wherein the intercepted response indicates that the requested item has been added to the user's order.

5. The method of claim 1, wherein the message is from a user identifying an item is key to an order, wherein the intercepted response further comprises whether the user would like to cancel the order if determined that the key item cannot be found, and the method further comprising, responsive to receiving a notification that the one or more items cannot be found, cancelling the order and notifying the user and a picker.

6. The method of claim 1, wherein the message is from a picker notifying a user that they cannot find an item in an order and submitting an image of where the item should be at a retailer store, wherein determining the suggestion or action further comprises correctly identifying the item in the image, or suggesting alternatives for the requested item, and wherein the intercepted response indicates to the picker that the item is in the image or suggesting the picker pick the suggested alternative.

7. The method of claim 1, further comprising:

identifying with a degree of confidence to intercept the message and generate the intercepted response;

compare the degree of confidence to a threshold value; and responsive to the comparison, outputting the intercepted response to the sending party.

8. The method of claim 1, further comprising:

obtaining one or more subsequent messages from the communication interface that occur after the intercepted response; and identifying whether the intercepted response received positive feedback or negative feedback from the receiving party from the one or more subsequent messages.

9. The method of claim 8, further comprising:

fine-tuning parameters of the machine-learned model based on the prompt, the intercepted response, and the obtained feedback for the conversation.

10. A non-transitory computer-readable storage medium storing instructions that when executed by a computer processor cause the computer processor to perform steps comprising:

providing instructions to generate a communication interface on one or more client devices;

receiving, from the one or more client devices, a message including natural-language text from a conversation sent from a sending party to a receiving party in a chat interface, wherein the receiving party is a user of an order fulfilment system, wherein the sending party is a picker fulfilling an order of the user, and wherein the message is from a picker indicating an item in an order of a user is not available at a retailer store;

providing a database that stores a map of the retailer store;

generating a prompt for input to a machine-learned language model, the prompt specifying at least the message including natural-language text from the chat interface and one or more inputs, and a request to infer whether a response can be generated for the message, and wherein the one or more inputs includes the message, an image of a portion of the retailer store, and the map of the retailer store from the database;

providing the prompt to a model serving system for execution by the machine-learned model for execution;

receiving, from the model serving system, a response generated by executing the machine-learned model on the prompt;

parsing the response from the model serving system to extract the response to the message;

automatically intercepting the conversation in the chat interface by generating an intercepted response to the message based on the parsed response, wherein the intercepted response indicates that an error has been made while fulfilling an order of the receiving party, and includes a suggestion or action to provide to the sending party in conjunction with the response, wherein the suggestion or action to correct the error is generated based on at least the map of the retailer store; and outputting an intercepted response to the sending party including the extracted response or a description of the suggestion or action.

11. The non-transitory computer-readable storage medium of claim 10, wherein the message is from a picker indicating an item in an order of a user is not available at a retailer store, wherein the prompt includes the message, an image of a portion of a retailer store, a map of the retailer store, and picker location data identifying a location of the picker in the retailer store, and wherein the intercepted response includes a message that the picker is in a wrong part of the retailer store.

12. The non-transitory computer-readable storage medium of claim 11, wherein generating the suggestion or action comprises:

retrieving a location of the item at the retailer store, and wherein the intercepted response includes the suggestion to navigate to the location of the retailer store to find the item.

13. The non-transitory computer-readable storage medium of claim 10, wherein the message is from a user requesting a picker to identify an item that is not in an order of the user, wherein identifying the suggestion or action further comprises invoking an application programming interface (API) call to add the item to the order of the user, and wherein the intercepted response indicates that the requested item has been added to the user's order.

14. The non-transitory computer-readable storage medium of claim 10, wherein the message is from a user identifying an item is key to an order, wherein the intercepted response further comprises whether the user would like to cancel the order if determined that the key item cannot be found, and the method further comprising, responsive to receiving a notification that the one or more items cannot be found, cancelling the order and notifying the user and a picker.

15. The non-transitory computer-readable storage medium of claim 10, wherein the message is from a picker notifying a user that they cannot find an item in an order and submitting an image of where the item should be at a retailer store, wherein determining the suggestion or action further comprises correctly identifying the item in the image, or suggesting alternatives for the requested item, and wherein the intercepted response indicates to the picker that the item is in the image or suggesting the picker pick the suggested alternative.

16. The non-transitory computer-readable storage medium of claim 10, further comprising:

identifying with a degree of confidence to intercept the message and generate the intercepted response;

comparing the degree of confidence to a threshold value; and responsive to the comparison, outputting the intercepted response to the sending party.

17. The non-transitory computer-readable storage medium of claim 10, further comprising:

obtaining one or more subsequent messages from the communication interface that occur after the intercepted response; and identifying whether the intercepted response received positive feedback or negative feedback from the receiving party from the one or more subsequent messages.

18. The non-transitory computer-readable storage medium of claim 17, further comprising:

fine-tuning parameters of the machine-learned model based on the prompt, the intercepted response, and the obtained feedback for the conversation.

* * * * *